US008543325B2

(12) United States Patent
Zeller et al.

(10) Patent No.: US 8,543,325 B2
(45) Date of Patent: Sep. 24, 2013

(54) COLLISION MONITORING FOR A MOTOR VEHICLE

(75) Inventors: Joerg Zeller, Stuttgart (DE); Mike Schliemann, Schwieberdingen (DE); Florian Kloss, Zwickau (DE); Nico Latsch, Oppenweiler (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/389,634

(22) PCT Filed: Jul. 23, 2010

(86) PCT No.: PCT/EP2010/060688
§ 371 (c)(1),
(2), (4) Date: Apr. 24, 2012

(87) PCT Pub. No.: WO2011/018321
PCT Pub. Date: Feb. 17, 2011

(65) Prior Publication Data
US 2012/0221236 A1    Aug. 30, 2012

(30) Foreign Application Priority Data
Aug. 11, 2009   (DE) .................... 10 2009 028 451

(51) Int. Cl.
*G08G 1/16*        (2006.01)
*B60Q 1/50*        (2006.01)

(52) U.S. Cl.
USPC ........... 701/301; 340/903; 340/468; 701/180; 701/382

(58) Field of Classification Search
USPC ................. 701/301, 180, 382; 340/468, 903
See application file for complete search history.

(56) References Cited

U.S. PATENT DOCUMENTS

| 4,779,095 | A | 10/1988 | Guerreri |
| 5,818,355 | A | 10/1998 | Shirai et al. |
| 2005/0073433 | A1* | 4/2005 | Gunderson et al. ........... 340/903 |
| 2007/0024431 | A1 | 2/2007 | Touge |
| 2009/0033477 | A1* | 2/2009 | Illium et al. .................. 340/436 |
| 2009/0309970 | A1* | 12/2009 | Ishii et al. ..................... 348/143 |

FOREIGN PATENT DOCUMENTS

| DE | 19654538 | 7/1997 |
| DE | 102006002232 | 7/2007 |
| EP | 20202341 | 2/2009 |

OTHER PUBLICATIONS

International Search Report, PCT International Application No. PCT/EP2010/060688, dated Sep. 22, 2010.

* cited by examiner

*Primary Examiner* — Fadey Jabr
*Assistant Examiner* — Yazan A Soofi
(74) *Attorney, Agent, or Firm* — Kenyon & Kenyon LLP

(57) ABSTRACT

A method for collision monitoring for a motor vehicle, a predefined surrounding area being monitored. The method includes the steps of providing information on the position and direction of motion of at least one object located in the surrounding area, providing vehicle information which indicates at least one position of a vehicle component and/or a driver's intended driving direction, designating an object if it is ascertained based on the vehicle information that the object does not pose any collision risk for the motor vehicle, and signalizing a collision risk if it is recognized based on the information on position and direction of motion that a not-designated object is approaching the motor vehicle.

12 Claims, 2 Drawing Sheets

COLLISION MONITORING FOR A MOTOR VEHICLE

FIELD OF THE INVENTION

The present invention relates to a method and a device for collision monitoring for motor vehicles, a surrounding area of the motor vehicle being monitored with the aid of object sensors.

BACKGROUND INFORMATION

A method and a device for collision monitoring in a motor vehicle are described in German Patent Application No. DE 10 2006 002 232 A1, position information of objects located in the surrounding area being initially generated as a reference state for every standstill of the motor vehicle. At regular time intervals or for certain incidents, e.g., the driver's intention to start driving, additional position information is determined as actual states. If it is recognized by comparing the particular actual state and the reference state that at least one object has approached the motor vehicle, a possible collision is recognized and a warning signal is output to the driver.

In this conventional method, the driver is thus warned about a possible collision with every object that is located in the surrounding area and approaches the motor vehicle, which is determined through comparison with the reference state. Thus, open doors of the motor vehicle, trailers or the like may generate collision warnings, although these objects do not pose any collision risk.

Furthermore, in the method described in German Patent Application No. DE 10 2006 002 232 A1 a warning is also issued for objects which are located in the surrounding area of the motor vehicle and do approach the motor vehicle but which are not located in the driving direction of the motor vehicle and which thus do not pose any collision risk either, since the motor vehicle travels into the driving direction intended by the driver and thus away from these objects.

In conclusion, the conventional method has the disadvantage that even objects which do not pose any collision risk generate unnecessary warning signals.

An object of the present invention is thus to provide an improved method and an improved device for collision monitoring for a motor vehicle which make it possible to avoid unnecessary warning signals to the driver.

SUMMARY

According to a first aspect of the present invention, an example method for collision monitoring for a motor vehicle is provided, a predefined surrounding area being monitored. The example method includes the steps:
  providing information on the position and direction of motion of at least one object located in the surrounding area;
  providing vehicle information which indicates at least one position of a vehicle component and/or a driver's intended driving direction;
  designating an object if it is ascertained based on the vehicle information that the object does not pose any collision risk for the motor vehicle; and
  signalizing a collision risk if it is recognized based on the information on position and direction of motion that a not-designated object is approaching the motor vehicle.

It may thus be ensured with the example method according to the present invention that an unnecessary warning may be avoided for objects that do not pose any collision risk. For example, a closing vehicle door does not pose any collision risk for the motor vehicle, although it is approaching the motor vehicle and would thus generate a collision warning in a conventional method. In the example method according to the present invention, the vehicle door is, however, designated as a vehicle component and does not generate a collision warning.

Furthermore, the driver's intended driving direction is analyzed to the effect that no warning is issued for objects the motor vehicle will not collide with due to the instantaneous or the intended driving direction, even if these objects were to approach the motor vehicle.

In this case, a collision risk may be signalized when a not-designated object would collide with the motor vehicle based on its position and its direction of motion in relation to the motor vehicle.

In addition, the distance between the object and the motor vehicle may also be taken into account when a collision risk is signalized, so that only those objects are signalized as a possible collision risk which are located no further than a predetermined maximum distance away from the vehicle.

Furthermore, it may be provided that a collision risk is signalized only when the not-designated object would collide with the motor vehicle within a predetermined period of time due to its motion speed in relation to the motor vehicle.

In this case, it may be provided that an object is designated if the object is a vehicle component which is located in the surrounding area. In this case, the vehicle component may include movable vehicle parts, in particular vehicle doors.

Alternatively or additionally, it may be provided that an object is designated when a driver's intended driving direction may be ascertained based on a turn signal and/or a steering wheel angle and/or a yaw angle and/or a gear position selection, and when the object is located outside an area which will be traversed by the motor vehicle in the intended driving direction.

In one specific embodiment of the method according to the present invention, the information on position and direction of motion of at least one object which is located in the surrounding area may be provided during the standstill of the motor vehicle. This allows collision monitoring to be implemented in particular upon the starting of the motor vehicle, and a collision risk may be signalized in particular in the case if the driver's intention to start driving is recognized based on the position of the brake and/or the gas pedal and/or based on the position of the power train of a manual or automatic transmission.

In another specific embodiment of the example method according to the present invention, the information on position and direction of motion of at least one object which is located in the surrounding area may be provided while the motor vehicle is traveling, thus allowing collision monitoring while the motor vehicle is traveling.

A warning signal may be output to the driver upon recognition of a possible collision; the warning signal may be an acoustic, a visual and/or a haptic warning signal.

According to a first aspect, an example device for collision monitoring for a motor vehicle is provided. The example device includes:
  at least one object sensor for monitoring a predefined surrounding area;
  a control unit which is designed to:
  provide information on the position and direction of motion of at least one object located in the surrounding area;

provide vehicle information which indicates at least one position of a vehicle component and/or a driver's intended driving direction; and designate the object if it is ascertained based on the vehicle information that the object does not pose any collision risk for the motor vehicle; and a signaling device for signaling a collision risk if it is recognized based on the information on position and direction of motion that a not-designated object is approaching the motor vehicle.

BRIEF DESCRIPTION OF THE DRAWINGS

In the following, one preferred specific embodiment of the present invention is described as an example based on the figures.

DETAILED DESCRIPTION OF EXAMPLE EMBODIMENTS

Figure 1:
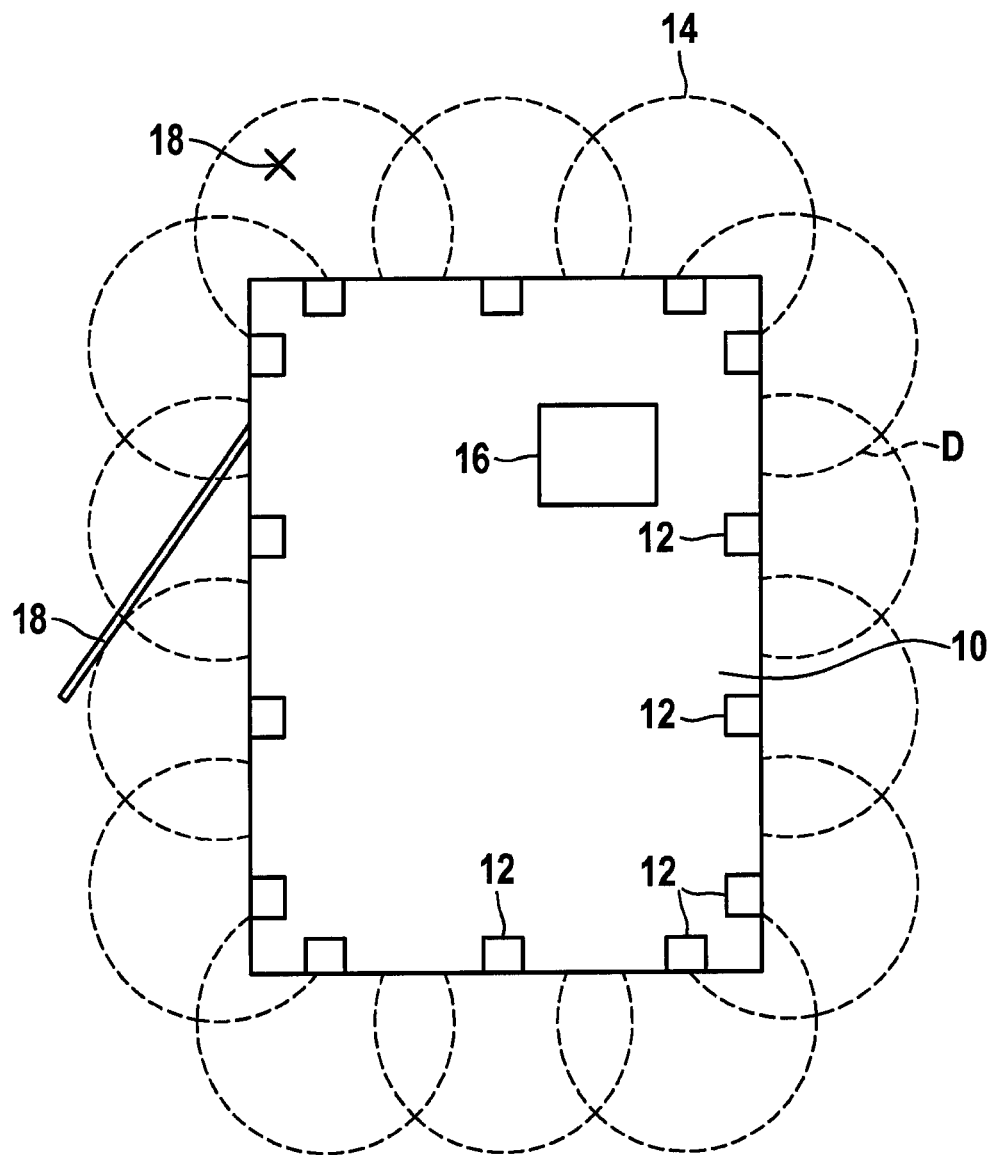
FIG. 1 schematically shows a motor vehicle having a device for collision monitoring according to one specific embodiment of the present invention.

FIG. 1 schematically shows a vehicle 10 having a plurality of object sensors 12. Object sensors 12 may, for example, include ultrasound sensors, radar sensors, laser sensors, infrared sensors or any other suitable type of object sensor. Every object sensor 12 has a detection range D, as illustrated in FIG. 1 using dashed lines. Individual detection ranges D of object sensors 12 overlap or supplement each other in such a way that the sum of the areas of all detection ranges D define a surrounding area 14 of motor vehicle 10.

Object sensors 12 may detect the presence of objects 18 in surrounding area 14 of motor vehicle 10 and may furthermore be designed in such a way that they may also determine the distance between particular object 18 and motor vehicle 10. Furthermore, the angular position of object 18 may also be determined in relation to motor vehicle 10 with the aid of object sensors 12.

A control unit 16 is connected to object sensors 12 and receives from object sensors 12 the position information of the detected objects, which indicates the position of one or multiple detected objects. Using the position information from object sensors 12, control unit 16 ascertains the position of an object 18 detected by object sensors 12 in surrounding area 14 of motor vehicle 10. In this case, the presence or absence of objects 18 may be ascertained in individual detection ranges D of object sensors 12, or the distance between every object 18 and motor vehicle 10 and the objects' direction with respect to motor vehicle 10 may be determined. Furthermore, the position of every object 18 may be determined in a suitable coordinate system around motor vehicle 10 in control unit 16 based on the position information.

Alternatively or additionally, the speed and the direction of motion of object 18 may also be ascertained in relation to motor vehicle 10. The direction of motion may, for example, be determined by ascertaining a motion vector from positions of the object in question detected at two different points in time, while the distance between the positions and the time period between the points in time indicates the speed of the object. Alternatively, the relative speed of the object with respect to object sensor 12 may be determined with the aid of the Doppler Effect for example.

Figure 2:
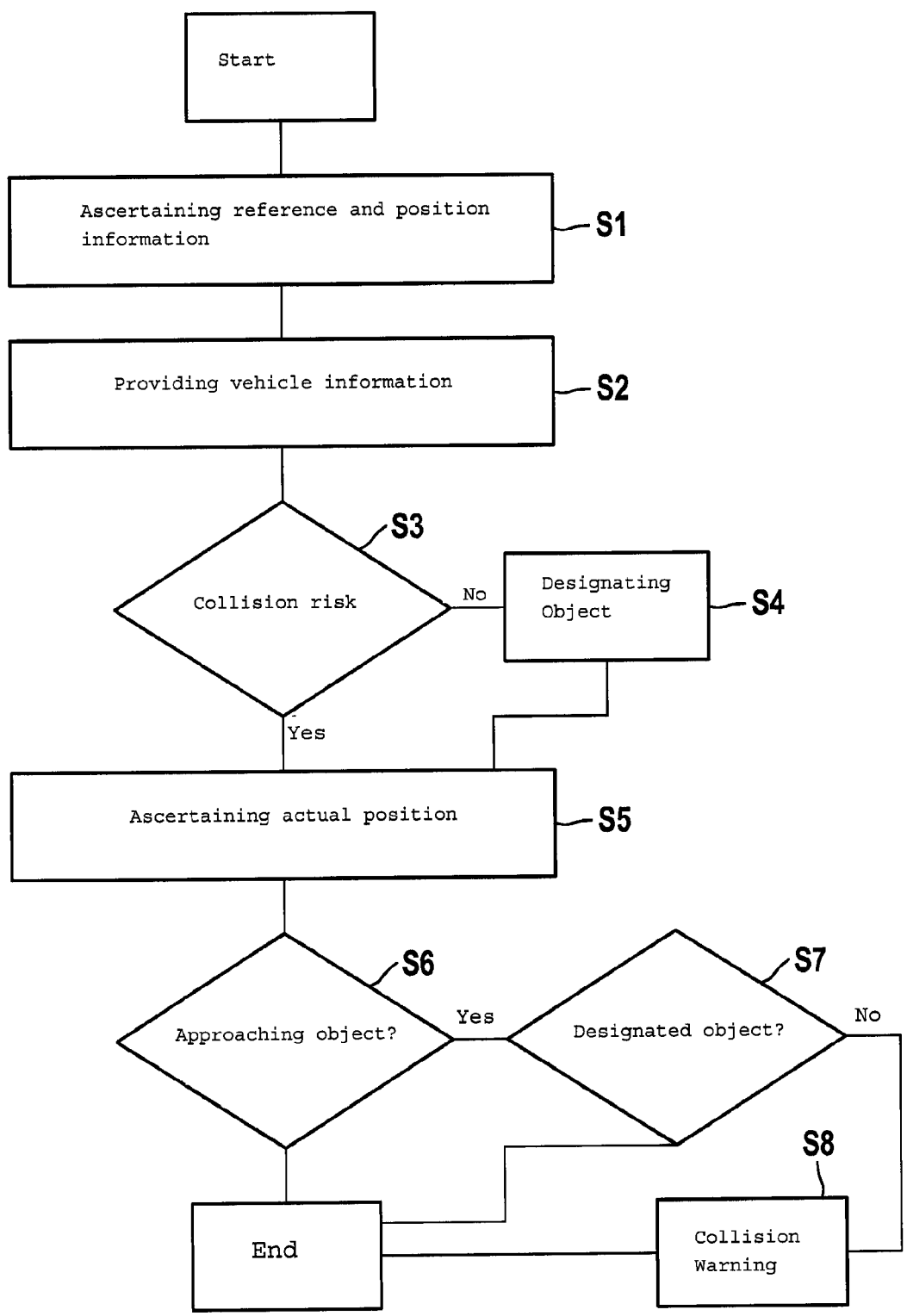
FIG. 2 shows a flow chart for illustrating a method for collision monitoring according to one specific embodiment of the present invention.

The mode of operation of the above-described device is explained in the following with reference to the flow chart in FIG. 2. In this case, the example method described hereafter is carried out in control unit 16.

Reference position information is initially ascertained in step S1. For this purpose, position information of one or multiple objects 18 in surrounding area 14 of motor vehicle 10 is determined with the aid of object sensors 12. Reference position information of an object 18 may include in this case the presence of an object in a detection range D of an object sensor 12 and/or the distance between object 18 and motor vehicle 10 and/or the direction of object 18 from motor vehicle 10.

If no object 18 is located in surrounding area 14 in the process of ascertaining the reference position information, one or multiple preset distance values may be used instead of the reference position information of an object. A preset distance value of this type may, for example, be equal to the length of particular detection range D for every detection range D of an object sensor 12.

In step S2, vehicle information is provided. This vehicle information may, on the one hand, indicate positions of vehicle components, i.e., components which are located on the vehicle and may be partially or entirely detected by one or multiple object sensors 12, such as the open door which is schematically shown in FIG. 1, trailers coupled to motor vehicle 10 or the like. Alternatively or additionally, the vehicle information may include direction information if it is detected based on a turn signal of motor vehicle 10 or on the analysis of a steering wheel angle or a yaw angle or based on the analysis of a gear position selection (e.g., shifting into reverse) that the driver of motor vehicle 10 intends to go in a certain direction.

In step S3, it is ascertained with the aid of the vehicle information for every object 18 located in surrounding area 14 whether object 18 poses a collision risk for motor vehicle 10. For example, it may be ascertained based on the corresponding vehicle information whether object 18 is a vehicle component by comparing the position of object 18 with the positions of vehicle components ascertained in step S2.

Furthermore, a travel area may be determined, which the vehicle travels in a certain (starting at the instantaneous point in time) time window, based on corresponding vehicle information ascertained in step S2, which indicates the driver's intended driving direction, and based on information regarding the speed of the vehicle, which is also provided. If the driving direction is straight ahead, the travel area corresponds to an area, for example, which starts at the front side of the vehicle and whose size is determined by the width of the vehicle and the length which results from the speed of the vehicle and the duration of the time window. It may also be ascertained whether object 18 is located in the travel area which motor vehicle 10 will traverse, if it travels in the driving direction determined by the analysis of step S2.

If it is determined in step S3 that object 18 is a vehicle component, it is designated in step S4. If object 18 is located outside the travel area, this object is also designated in step S4. A designation of this type may include the placing of an object flag for the specified object, the object being unambiguously defined by its position determined in step S1. Different types of objects (e.g., vehicle components or objects which are not located in the driving direction of motor vehicle 10) may be provided with different types of object flags or different values of a designation parameter.

In step S5, actual position information of objects 18 in surrounding area 14 is ascertained. This step is carried out in predefined time intervals or for predetermined incidents, e.g., when the driver's intention to start driving is recognized based on the position of the brake and/or the gas pedal and/or based on the position of the power train of a manual or automatic transmission, for example.

In this case, the positions of objects 18 located in the surrounding area are determined. Similar to ascertaining the reference position information in step S2, the position information of object 18 may also be determined here in a suitable coordinate system, or a distance value and/or direction information and/or a relative speed and/or a direction of motion of object 18 may be determined in relation to motor vehicle 10.

Information on position and direction of motion is subsequently ascertained for every object 18 in surrounding area 14 using the reference position information determined in step S1 and the actual position information determined in step S5. A direction of motion of every object 18 in relation to motor vehicle 10 may in this case be determined by either comparing the actual position information and the reference position information, or a direction of motion and a motion speed of every object 18 may, for example, be determined directly by object sensors 12 with the aid of the Doppler Effect.

In step S6, it is determined by analyzing the information on position and direction of motion for every object 18 in surrounding area 14 whether at least one object 18 has approached motor vehicle 10. As a result, the case is detected that an object 18, which has already been located in surrounding area 14 of motor vehicle 10 when the reference position information was ascertained, has traveled toward motor vehicle 10, as well as the case that an object 18, which has not yet been located in surrounding area 14 when the reference position was ascertained, has traveled into surrounding area 14.

If no object 18 has approached motor vehicle 10, the process is completed since no collision risk has been recognized.

If it is determined in step S6 that at least one object 18 has approached motor vehicle 10, it is checked in step S7 whether this is a designated object for which an object flag was set in step S4. If it is apparent from the set object flag that object 18 does not pose any collision risk, although it has approached motor vehicle 10, the process is completed since no collision risk has been recognized.

If it is determined in step S7 that object 18 might pose a collision risk since this object 18 has not been designated in step S4, a collision risk is recognized and information about a possible collision is provided in step S8 and/or an acoustic and/or a visual and/or a haptic warning signal is output to the driver.

It is possible that different warning signals are output as a function of different driving situations of motor vehicle 10. For example, during the standstill of motor vehicle 10 a first warning signal may be output if a collision risk is recognized and a second warning signal may be output in addition to that if a driver's intention to start driving is recognized.

Instead of reference position information which is ascertained from the distance between an object 18 which is located in surrounding area 14 and motor vehicle 10, a fixed and predefined reference distance may be assumed as reference position information regardless of the presence and the position of objects 18 in surrounding area 14 of motor vehicle 10.

In this case, it is checked in step S6 whether an object 18 has a shorter distance to motor vehicle 10 than the reference distance and whether it is approaching motor vehicle 10. If this is the case, it is checked in step S7, as described above, whether object 18 poses a collision risk for the vehicle, and a warning signal is output in step S8 if necessary.

What is claimed is:

1. A method for collision monitoring a predefined surrounding area of a motor vehicle, comprising:
   providing, by at least one sensor, information on a position and direction of motion of at least one object located at least partially in the surrounding area;
   providing, by the at least one sensor, vehicle information which indicates at least one position of a component of the motor vehicle;
   based on the vehicle information, determining whether any of the at least one object is a component of the motor vehicle, the any of the at least one object determined to be a component of the motor vehicle being designated as a non-risk object; and
   conditional upon that the at least one object includes an object (a) not designated as a non-risk object and (b) recognized based on the information on position and direction of motion to be approaching the motor vehicle, signaling, by a signaling device, a collision risk.

2. The method as recited in claim 1, further comprising:
   providing, by the at least one sensor, a driver's intended driving direction and
   designating as a non-risk object, an object ascertained, using the intended driving direction, not to pose any collision risk for the motor vehicle due to its location outside an area which will be traversed by the motor vehicle in the intended driving direction.

3. The method as recited in claim 1, wherein a collision risk is signaled when, that an object not designated as a non risk object would collide with the motor vehicle is determined based on a position, and a direction of motion in relation to the motor vehicle, of the respective object.

4. The method as recited in claim 1, wherein a collision risk is conditional upon that a determination is made that an object of the at least one object not designated as a non-risk object would collide with the motor vehicle within a predetermined period of time, based on a position, a direction of motion in relation to the motor vehicle, and a motion speed in relation to the motor vehicle, of the respective object.

5. The method as recited in claim 1, wherein the component of the motor vehicle includes a movable vehicle part.

6. The method as recited in claim 5, wherein the moveable vehicle part includes a vehicle door.

7. The method as recited in claim 2, wherein the intended driving direction is ascertained based on at least one of a turn signal, a steering wheel angle, a yaw angle, and a gear position selection.

8. The method as recited in claim 1, wherein the information on position and direction of motion of the at least one object which is located in the surrounding area is provided during a standstill of the motor vehicle.

9. The method as recited in claim 1, wherein the information on position and direction of motion of the at least one object which is located in the surrounding area is provided while the motor vehicle is traveling.

10. The method as recited in claim 1, wherein a warning signal is output to the driver if a collision risk is signaled.

11. A device for collision monitoring for a motor vehicle, comprising:
    at least one object sensor to monitor a surrounding area of the motor vehicle;
    a control unit of the motor vehicle which is configured to:
       provide information on a position and direction of motion of at least one object located in the surrounding area;

provide vehicle information which indicates at least one position of a vehicle component of the motor vehicle; and based on the vehicle information, determine whether any of the at least one object is a component of the motor vehicle, the any of the at least one object determined to be a component of the motor vehicle being designated as a non-risk object; and a signaling device configured to, conditional upon that the at least one object includes an object (a) not designated as a non-risk object and (b) recognized based on the information on position and direction of motion to be approaching the motor vehicle, signal a collision risk.

12. A non-transitive computer-readable medium on which are stored instructions executable by a data processing device, the instructions which when executed by the data processing device, cause the data processing device to perform a collision monitoring method, the collision monitoring method comprising:

providing information on a position and direction of motion of at least one object located at least partially in the surrounding area;

providing vehicle information which indicates at least one position of a component of the motor vehicle;

based on the vehicle information, determining whether any of the at least one object is a component of the motor vehicle, the any of the at least one object determined to be a component of the motor vehicle being designated as a non-risk object; and conditional upon that the at least one object includes an object (a) not designated as a non-risk object and (b) recognized based on the information on position and direction of motion to be approaching the motor vehicle, signaling a collision risk.

* * * * *